Patented Apr. 2, 1940

2,195,462

UNITED STATES PATENT OFFICE 2,195,462

COMPOUNDS OF THE ANTHRAQUINONE SERIES

Artur Krause, Ludwigshafen - on - the - Rhine, Walther Kuehne, Mannheim, and Walter Mieg, Opladen, Germany, assignors to General Aniline & Film Corporation, a corporation of Delaware No Drawing. Application December 18, 1937, Serial No. 180,612. In Germany December 23, 1936

8 Claims. (Cl. 260—380)

The present invention relates to compounds of the anthraquinone series and a process of producing them.

We have found that valuable new compounds of the anthraquinone series are obtained by causing phosphorus halides to act on amino compounds of the anthraquinone series having at least one exchangeable hydrogen atom attached to nitrogen, and treating the resulting compounds with alkaline agents.

The amino compounds serving as initial materials may contain one or more amino groups, at any position of the molecule. The amino groups may also be attached to the anthraquinone nucleus by atomic bridges. The term "compounds of the anthraquinone series" is intended to include not only anthraquinones but also azanthraquinones and anthraquinones having attached rings. There may be mentioned, for example, 1-amino-anthraquinones, 1.4-diaminoanthraquinones, 1.4.5.8-tetraaminoanthraquinones, 1 - amino - 4 - anilidoanthraquinones, 1 - amino-4- (para-aminophenyl) -aminoanthraquinones, aminoanthrapyrimidines, 1-amino-4-hydroxyanthraquinones, diaminoanthrarufin, 1.4-diamino-2-methoxyanthraquinone and 1.4-diaminoanthraquinone-2-carboxylic acid amide. Among phosphorus halides there may be mentioned phosphorus trichloride, phosphorus pentachloride, phosphorus oxychloride as well as the corresponding bromine and iodine compounds. Generally speaking, phosphorus oxychloride proves to be the most suitable.

The reaction is preferably carried out below room temperature and in an organic diluent in the presence of an additional substance capable of binding acids. For the latter purpose there may be mentioned, for example, ammonia or organic bases, such as pyridine, quinoline or dimethylaniline. The said substances may also serve simultaneously as solvents.

The substances, thus first formed, still contain halogen. They are converted into compounds free from halogen by treatment with alkaline agents, such as caustic alkalies, alkali carbonates, or bases, such as piperidine. The resulting compounds are most probably phosphamic acids. They are usually colored, readily soluble in water and can either be used as dyestuffs or for the preparation of dyestuffs. It is of special importance that they are soluble in water and usually dye acetate artificial silk, wool and viscous artificial silk very fast shades.

The following examples will further illustrate how the said invention may be carried out in practice but the invention is not restricted to these examples. The parts are by weight.

Example 1

30.7 parts of phosphorus oxychloride are allowed to drop, while stirring, below zero C. into a suspension of 26.8 parts of 1.4-diamino-2-methoxyanthraquinone in 100 parts of anhydrous pyridine. As soon as a sample withdrawn is completely soluble when heated with aqueous sodium carbonate solution, the mixture is poured into an aqueous solution of 70 parts of sodium carbonate and, after thoroughly stirring, the pyridine is removed with steam. The deep red alkaline solution is, if necessary, freed from undissolved constituents by filtration, and the resulting compound is separated by salting out or by careful acidification of the cooled solution. Since it is readily decomposable it is preferable, immediately after its separation by filtration and washing with cold water, to reconvert it into its stable alkali salt by the addition of an alkali carbonate solution.

The new compound is a 1.4-diamino-2-methoxyanthraquinone containing from 1 to 2 groups

instead of a hydrogen atom of the amino group. It is difficultly soluble in water in the form of the free acid. Its alkali salts dissolve very readily in water giving a deep red coloration. By heating for a short time in solution in mineral acid, the new compound is split up with the reformation of 1.4-diamino-2-methoxyanthraquinone. It dyes acetate artificial silk, wool or viscose artificial silk powerful bluish red shades of excellent fastness.

If 23.8 parts of 1.4-diaminoanthraquinone be used instead of 26.8 parts of 1.4-diamino-2-methoxyanthraquinone, a similar compound is obtained which dissolves readily in aqueous alkali carbonate solution, giving a violet coloration, and yields fast violet dyeings on acetate artificial silk, wool or viscose artificial silk.

In the same manner, with 1-amino-4-(para-aminophenyl)-aminoanthraquinone, a final product soluble in aqueous alkalies, giving a deep blue coloration, is obtained which yields blue dyeings on acetate artificial silk, wool or viscose artificial silk.

Example 2

34.5 parts of 1-amino-4-para-anisidinoanthraquinone are suspended in a mixture of 200 parts of nitrobenzene and 130 parts of pyridine and 15.4 parts of phosphorus oxychloride are added to the mixture at from zero to 5° C. while stirring. The reaction is completed as soon as a sample withdrawn, mixed with an excess of aqueous alkali carbonate solution and freed from nitrobenzene by boiling, is completely soluble in water. As soon as this is the case, the reaction mixture is shaken well with 100 parts of 38 per cent caustic soda solution and 500 parts of 20 per cent sodium carbonate solution, and then freed from nitrobenzene and pyridine with steam under reduced pressure. The blue solution, which is filtered if necessary, contains the sodium salt of the compound formed. It may be separated, by careful acidification of the solution, in the form of the water-insoluble free acid and separated in the usual manner. Its alkali salts are very readily soluble in water, giving a blue coloration. The said solutions dye acetate artificial silk, wool or viscose artificial silk powerful blue shades.

Example 3

90 parts of phosphorus oxychloride are slowly added, drop by drop, while stirring, to a suspension of 50 parts of 1.4.5.8-tetraaminoanthraquinone in 1000 parts of dry pyridine at 15° below zero C. Then the mixture is stirred until a sample is entirely soluble in 3 per cent caustic soda solution. After introducing the whole into 5000 parts of 3 per cent caustic soda solution, the pyridine is removed by means of steam. The dark-blue aqueous solution is then acidified with hydrochloric acid or dilute sulphuric acid, the precipitate thus formed is filtered off by suction and triturated with a small amount of sodium carbonate solution or caustic soda solution until it becomes alkaline. After drying, a blue powder is obtained which dissolves very readily in water, giving a blue coloration, and dyes acetate artificial silk, wool or silk fast dark-blue shades from a neutral or slightly acid bath.

Example 4

50 parts of phosphorus oxychloride are added while vigorously stirring to a suspension of 25 parts of finely ground 4-amino-1.9-anthrapyrimidine in 500 parts of dry pyridine. The whole is heated at from 40 to 50° C. while stirring, until a sample has become entirely soluble in 3 per cent caustic soda solution. Then the mixture is poured into 2500 parts of 5 per cent caustic soda solution and the pyridine removed by means of steam. After cooling, the aqueous solution is acidified with hydrochloric acid, the resulting precipitate is filtered off by suction, washed and triturated with a small amount of caustic soda solution, until it has turned slightly alkaline, and dried. The dyestuff thus obtained is soluble in water, giving a yellow-brown coloration, and dyes acetate artificial silk, wool or silk greenish yellow, very fast shades from a neutral or slightly acid bath.

Example 5

22.3 parts of 1-aminoanthraquinone are introduced while stirring into a solution of 21 parts of phosphorus pentachloride in 90 parts of dry nitrobenzene. Then the mixture is slowly heated at about 75° C. in the course of 2 hours, whereupon heating is continued at the same temperature, until hydrogen chloride no longer escapes and a sample treated with 5 per cent caustic soda solution has become entirely soluble in water. The melt is stirred in 300 parts of 10 per cent caustic soda solution, and the nitrobenzene is removed by means of steam. After cooling, the red aqueous solution is acidified, the yellow-brown precipitate is filtered off by suction and triturated with some caustic soda solution until a sample has become slightly alkaline. By drying this paste, a watersoluble dyestuff is obtained which dyes acetate artificial silk yellow-red, very fast shades.

What we claim is:

1. A process of producing compounds of anthraquinone which comprises acting on an amino compound of an anthraquinone containing no esterifiable hydroxy groups with a phosphorus halide and treating the resulting compounds with alkaline agents.

2. A process of producing compounds of anthraquinone which comprises acting on an amino compound of an anthraquinone containing no esterifiable hydroxy groups with phosphorus oxychloride and treating the resulting compounds with alkaline agents.

3. A process of producing compounds of anthraquinone which comprises acting on an amino compound of an anthraquinone containing no esterifiable hydroxy groups with a phosphorus halide in the presence of a substance capable of binding acids and treating the resulting compounds with alkaline agents.

4. A process of producing compounds of anthraquinone which comprises acting on an amino compound of an anthraquinone containing no esterifiable hydroxy groups with a phosphorus halide at a temperature below room temperature and treating the resulting compounds with alkaline agents.

5. A compound of anthraquinone

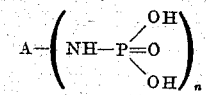

wherein A is the radical of an anthraquinone and $n$ a whole number up to two.

6. An anthraquinone containing in up to two alpha-positions a group

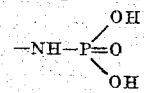

7. An anthraquinone containing in up to two alpha-positions a group

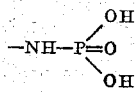

and in each of the remaining alpha-positions an amino group.

8. An anthraquinone derivative of the formula

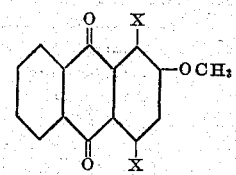

in which X stands for a substituent selected from the class consisting of —NH$_2$ and

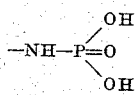

at least one X being

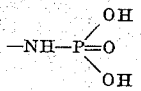

ARTUR KRAUSE.
WALTHER KUEHNE.
WALTER MIEG.